(12) United States Patent
Veugen

(10) Patent No.: US 10,116,445 B2
(45) Date of Patent: Oct. 30, 2018

(54) METHOD AND SYSTEM FOR PROTECTED EXCHANGE OF DATA

(71) Applicant: Nederlandse Organisatie voor toegepast-natuurwetenschappelijk onderzoek TNO, 's-Gravenhage (NL)

(72) Inventor: Peter Joannes Mathias Veugen, 's-Gravenhage (NL)

(73) Assignee: Nederlandse Organisatie Voor Toegepast-Natuurwetenschappelijk Onderzoek Tno, 'S-Gravenhage (NL)

( * ) Notice: Subject to any disclaimer, the term of this patent is extended or adjusted under 35 U.S.C. 154(b) by 546 days.

(21) Appl. No.: 14/439,719

(22) PCT Filed: Oct. 29, 2013

(86) PCT No.: PCT/NL2013/050764
§ 371 (c)(1),
(2) Date: Apr. 30, 2015

(87) PCT Pub. No.: WO2014/069998
PCT Pub. Date: May 8, 2014

(65) Prior Publication Data
US 2015/0295712 A1 Oct. 15, 2015

(30) Foreign Application Priority Data
Oct. 30, 2012 (EP) .................................... 12190503

(51) Int. Cl.
*G06F 21/62* (2013.01)
*H04L 9/32* (2006.01)
(Continued)

(52) U.S. Cl.
CPC .......... *H04L 9/321* (2013.01); *G06F 21/6245* (2013.01); *G06F 21/6263* (2013.01);
(Continued)

(58) Field of Classification Search
CPC .................................................. H04L 63/0421
See application file for complete search history.

(56) References Cited

U.S. PATENT DOCUMENTS

| 8,800,027 B1 * | 8/2014 | Ackerman | .............. G06F 21/31 380/250 |
| 2006/0129812 A1 * | 6/2006 | Mody | ..................... H04L 63/04 713/168 |

(Continued)

FOREIGN PATENT DOCUMENTS

EP 2120393 A1 11/2009

OTHER PUBLICATIONS

Veugen,"Comparing Encrypted Data," Multimedia Signal Processing Group, Netherlands.
(Continued)

*Primary Examiner* — Jason C Chiang
(74) *Attorney, Agent, or Firm* — Hoffmann & Baron, LLP

(57) ABSTRACT

A result of application of a test to information about a user (U) is securely transmitted between a source of information (A) and a destination of information (B) via an intermediary device (C). The source of information can be, for example, a database of personal data, and the destination of information (B) a server of a service provider performing services depending on an age limit. The intermediary device (C) minimizes the information that is made available to the source (A) and the destination (B) about the purpose of the test and the underlying data. To this end, the intermediary device (C) executes a secure comparison protocol with the source (A), whereby the encrypted result is additionally blinded, for example, with a blinding that comes from the user. The intermediary device (C) decrypts the blinded encrypted result, so that a blinded result is left. The destination B removes the blinding, preferably on the basis of (Continued)

blinding information of the user. The intermediary device (C) preferably sends the blinded comparison result to the user (U).

16 Claims, 3 Drawing Sheets

(51) Int. Cl.
*H04L 29/06* (2006.01)
*H04L 9/00* (2006.01)
*G06F 21/64* (2013.01)

(52) U.S. Cl.
CPC ............ *G06F 21/645* (2013.01); *H04L 9/008* (2013.01); *H04L 9/3236* (2013.01); *H04L 9/3271* (2013.01); *H04L 63/0421* (2013.01); *H04L 63/0428* (2013.01); *H04L 63/0471* (2013.01)

(56) References Cited

U.S. PATENT DOCUMENTS

| | | | |
|---|---|---|---|
| 2006/0204011 A1* | 9/2006 | Adams | H04L 51/14 380/282 |
| 2007/0116283 A1* | 5/2007 | Tuyls | H04L 9/008 380/255 |
| 2007/0215689 A1* | 9/2007 | Algiene | G06Q 20/06 235/379 |
| 2007/0220094 A1* | 9/2007 | Kerschbaum | H04L 9/302 709/204 |
| 2008/0097908 A1* | 4/2008 | Dicks | A61B 5/0022 705/50 |
| 2008/0144832 A1* | 6/2008 | Kerschbaum | H04L 9/30 380/277 |
| 2009/0112629 A1* | 4/2009 | Leiper | G06F 19/322 705/3 |
| 2009/0154709 A1* | 6/2009 | Ellison | H04L 9/083 380/282 |
| 2010/0091984 A1* | 4/2010 | Kerschbaum | G06F 21/72 380/30 |
| 2011/0113237 A1* | 5/2011 | Hird | G06F 21/34 713/155 |

OTHER PUBLICATIONS

O'Keefe et al, "Privacy-Preserving Data Linkage Protocols," WPES'04, Washington DC, 2004.

Balopoulos et al, "Specifying and implementing privacy-preserving cryptographic protocols," IJIS, vol. 7, pp. 295-420, 2008.

Kolesnikov et al, "From Dust to Dawn: Practically Efficient Two-Party Secure Function Evaluation Protocols and their Modular Design," International Association for Cryptologic Research, vol. 20101120:104650; pp. 1-26, Section 4.1, 2010.

Yao A.,"Protocols for Secure Computations," in Proceedings of the IEEE Symposium on Foundations of Computer Science, pp. 160-164, 1982.

Kolesnikov et al., "Improved garbled circuit building blocks and applications to auctions and computing minima," Tech. Rep. 411, Cryptology ePrint Archive, 2009.

Blake et al., "Strong conditional oblivious transfer and computing on intervals", in SLI-ACRYPT. Advances in Cryptology, vol. 3329, 00. pp. 515-529 2004.

Schoenmakers et al., "Practical two-party computation based on the conditional gate," in ASI-ACRYPT'04. Advances in Cryptology, No. 3329 in Lecture Notes in Computer Science, pp. 119-136, Springer, 2004.

Garay et al., "Practical and secure solutions for integer comparison," in Public Key Cryptograpy—PKC'07., vol. 4450, pp. 330-342, Springer-Verlag, 2007.

Kerschbaum et al., "Performance Comparison of Secure Comparison Protocols," IEEE Computer Society, pp. 133-136, 2009.

Kerschbaum et al., "Filtering for private collaborative benchmarking," Emerging trends in information and communication security LNCS 3995, pp. 409-422, 2006.

Fischlin, M., "A cost-effective pay-per-multiplication comparison method for millionaires," in CT-RSA 2001: Proceedings of the 2001 Conference on Topics in Cryptology, London, UK, pp. 457-472, Springer-Verlag 2001.

Damgard et al., "A correction to efficient and secure comparison for on-line auctions," Journal of applied cryptology, vol. 1, No. 4, pp. 323-324, 2009.

Damgard et al., "Homomorphic encryption and secure comparison," Journal of applied cryptology, vol. 1, No. 1, pp. 22-31, 2008.

* cited by examiner

METHOD AND SYSTEM FOR PROTECTED EXCHANGE OF DATA

This application is the U.S. National Phase of, and Applicants claim priority from, International Patent Application Number PCT/NL2013/050764 filed Oct. 29, 2013, which claims priority from EP 12190503.8 filed Oct. 30, 2012, each of which is incorporated herein by reference.

FIELD OF THE INVENTION

The invention relates to a method for exchanging data, devices for the secure exchange of data, and a computer program for carrying out the method.

BACKGROUND

Use of an encryption device in sending information is a known technique to prevent unauthorized parties being able to gain access to the information. Also in sending information over the Internet this is utilized. In the most simple processes this involves transmission between two apparatuses, further called A and B, with A acting as sending apparatus and B as receiving apparatus. Briefly stated, encrypting ensures that the recipient alone can read the message. It provides certainty to the sender that the message can actually be read by the recipient alone. This is done in asymmetric encryption systems by encrypting the message with the public key of the recipient. The recipient alone can decrypt the message with his private key. Encrypting hence does not provide certainty to the recipient that the message originates from the sender (anyone can encrypt with the public key of the recipient), but does provide certainty to the sender that the recipient alone can decrypt the message.

Mutual certainty can be provided by applying both signing and encrypting. There are different techniques of signing (digital signature) known to counteract intrusion of such communication by unauthorized parties.

(1) User certificates (signing): "The recipient verifies that the message originates from the sender". Providing certainty to the recipient that the message actually originates from the sender. This is done by encrypting the message with the private key of the sender. Each recipient can decrypt with the public key of the sender (for instance from the latter's user certificate). Signing hence does not provide certainty to the sender that the recipient alone can decrypt the message (anyone can decrypt with the public key of the sender), but does provide certainty to the recipient that the message has been sent by the sender.

(2) Browser certificates. Standard certificates in browsers are not user certificates, but server certificates. With them, the user (U) can check that the server with which he is communicating (C) is actually the server he thinks he is communicating with. These certificates do not provide certainty to the server C that the user U is who he claims to be. For that, the user can be asked to log in at server C, so that such certainty does arise.

In an example of an application to webstores, a user U may, for instance, give instruction to send information from A to B in order to be able to obtain a service from B. The service concerned may depend on personal information about U, such as age, which needs to be retrieved at a trusted party A, such as, for instance, the authorities, or a sufficient bank balance, which needs to be confirmed by a trusted bank A. Technically, this means that B generates a request for information, to which A, by order of U, responds by searching in a database of A for information with an identification of U, after which the information is sent to B in a reply. Statutory regulations on the registration of such data and access thereto (Dutch WBP Act: "Personal Data Protection Act") set limiting conditions on such a process. For instance, A needs to be entitled to keep the database, and there are limitations circumscribing at whose request and to whom which information may be provided.

Jointly, the use of certification, signing and encryption can ensure that (a) privacy sensitive information can only be requested by an apparatus U ("user") that can show a certificate proving he has the right to query the information (or demonstrates this right by logging in with a password), (b) it can be verified that the retrieved information has been delivered by an authoritative source A, (c) the recipient of the information is indeed a party B that has been designated for that purpose by U, and (d) that the information can be inspected by B and U alone.

But nonetheless there is some loss of privacy. The apparatus B could, after decryption, register more information than is strictly necessary for the service rendered, which makes abuse possible. Further, in conventional implementations the apparatus A can, on the basis of apparatus B for which the information is intended, register what information for what service-provider has been retrieved for the user U, which entails the possibility of unauthorized use of this information by A (for instance, the authorities or a bank), and in any case violates the privacy of U. This problem can be mitigated by having A provide the information to U alone, and forwarding this information from U to B. But this increases the risk of manipulation of the information and the request therefor. This risk can be reduced by use of a trusted intermediary device C as a proxy for U between A and B. But in this case, too, A could infer more information from the request than is desirable.

In the prior art the so called secure comparison protocol is known, with which also the information exchange between apparatuses A and B can be limited. A secure comparison protocol (also known as a solution of the "millionaires problem") is an algorithm to compare a first and second number which are respectively known to a first and second party, without either party needing to know both numbers. For examples, see the article "Comparing encrypted data" by T. Veugen, published on http://isplab-.tudelft.nl/sites/default/files/Comparing%20encrypted%20data.pdf.

With the secure comparison protocol it can be ensured that the apparatus A at the source of the information and the apparatus B generating the request for the information do not get to know what their information is compared with. A and B in this case see only a part of the result of the comparison. But if A executes the protocol with B, A still learns the identity of B, and hence also learns that for U a particular kind of information for a service associated with B has been requested. U could prevent this by requesting information signed by A and forwarding it to B, but this can be done only if A knew the comparison result. If for the encryption a public key of B is used, A could find out the identity of B on the basis of this public key. Creating keys exclusively for the session leads to overhead. If a proxy C executes the secure comparison protocol on behalf of U with A, then C can get access to confidential results about U from A. Also, if C is not sufficiently trusted, U would not have any certainty that C will not of its own initiative retrieve information about U at A.

It is desirable to provide for a process for sending information that satisfies the following limiting conditions:

1. Between the apparatus A with the information about user U and the apparatus B for which the information is intended, an intermediary device C has to be used that prevents A from being able to register for what apparatus B the information is intended.
2. C may not get access to the information.
3. The user U must first give his permission before the reply to the question may be forwarded by C to B.
4. It is not necessary that U disposes of a certificate or another cryptographic key.
5. Preferably, it is impossible for C on its own initiative to ask A for information and obtain it.
6. The result of the comparison may not become known at apparatus A, but may at B and C.

It is desirable to provide for process steps with which an intermediary device C makes it possible to provide such a process for sending information that satisfies the limiting conditions mentioned.

It is desirable to provide for an intermediary device C that makes it possible to provide such a process for sending information that satisfies the limiting conditions mentioned.

It is desirable to provide for a user device U that makes it possible to provide such a process for sending information that satisfies the limiting conditions mentioned.

SUMMARY

The solution according to a preferred embodiment of the invention is as follows:
1. C sends the certificates of A and B to U.
2. U takes the public keys of A and B from the certificates.
2a (Optional) U checks the certificates.
3. U sends a same random bit $b\_u$ to A and B without C learning the bit.
4. A and C execute a secure comparison protocol, which results in a bit t.
5. A blinds t with the random bit $b\_u$ and sends the exclusive or of enciphered bit t with the random bit $b\_u$ to C.
6. C deciphers the bit (t xor $b\_u$) and sends it to U.
7. U takes off his bit $b\_u$ and assesses whether he wishes to send the outcome t to B=RP or not.
8. As soon as the user U gives permission, C sends bit (t xor $b\_u$) to B.
9. Because B has also received $b\_u$, B can therefore derive the outcome t.

In step 3, for the purpose of transmission, preferably use is made of encryption with the public keys of A and B. By use of the secure comparison protocol, the bit t, in step 4, is preferably produced encrypted.

Step 3 can be done as follows
a. U generates a random bit $b\_u$ and a large enough random number r and computes the hash $h\_u = h(b\_u|r)$.
b. U enciphers the numbers ($b\_u$, r) with the public keys of A and B=RP.
c. U sends $[b\_u|r]\_\{AP\}$, $[b\_u|r]\_\{RP\}$ and $h\_u$ to C.
d. C sends $[b\_u|r]\_\{AP\}$ and $h\_u$ to A and A checks whether $h\_u$ is correct.
e. C sends $[b\_u|r]\_\{RP\}$ and $h\_u$ to B and B checks whether $h\_u$ is correct. (this step can also be done later when C sends the result to B, for instance in step 8).

What has been achieved now?
A and B do not learn each other's identity, but B has trust in the result because it comes from C.

Each query to A is preceded by a message from the user, which makes it more difficult for C to ask arbitrary questions. In case of doubt, C may even be asked to submit $[b\_u|r]\_\{AP\}$, $[b\_u|r]\_\{RP\}$ and $h\_u$, after which A and B can confirm whether this information is right or not.

The user U does not need a certificate. What he does need to be able to do is: generating random numbers, computing hash functions, exclusive or execution of 2 bits, verifying signatures (only necessary for extra security) and enciphering messages.

In an embodiment, ($b\_u$, r, sessiontoken) instead of ($b\_u$, r) can be used to ensure that the outcomes correspond to the right sessions.

The use of hash functions is known, but applying a hash function to solve the above problem is not obvious. The reason is that the bit (t xor $b\_u$) which is to be communicated from A=AP to user has first been conceptually inverted by having the user generate a bit and sending that to the A=AP and then using the hash function to enforce that B=RP receives the same bit.

The computer program may be stored on a tangible carrier, such as a DVD, but may also be retrievable via Internet.

A system for implementing the invention comprises several devices, where each device may comprise a processor, a memory and an input-output unit. The processor can be a general (micro)processor. Also, a unit can comprise a special cryptographic processor. The memory may be configured for storing processor instructions for carrying out the steps of the method according to the invention. Further, the memory of a device may be configured for storing data and cryptographic keys, possibly a separate memory (protected or otherwise) is provided for this.

In the above, reference has been made to the transfer of 1 bit. The outcome of the comparison protocol, which is by definition a bit, is made up of a bit (P) at the A and a bit (Q) at C, such that the outcome t equals P xor Q. In some embodiments, that outcome is the difference of two large numbers $x\_A$ and $x\_C$, such that the outcome is equal to the number $x\_A - x\_C$, for instance. In other words, also numbers greater than one bit can be transferred according to the present invention.

It will therefore be clear to those skilled in the art that the invention is not limited to the embodiments described and that many supplements and modifications are possible without departing from the ambit of the invention.

BRIEF DESCRIPTION OF THE DRAWINGS

These and other aspects will be apparent from a description of embodiments with reference to the following figures.

DETAILED DESCRIPTION OF EXEMPLARY EMBODIMENTS

Figure 1:
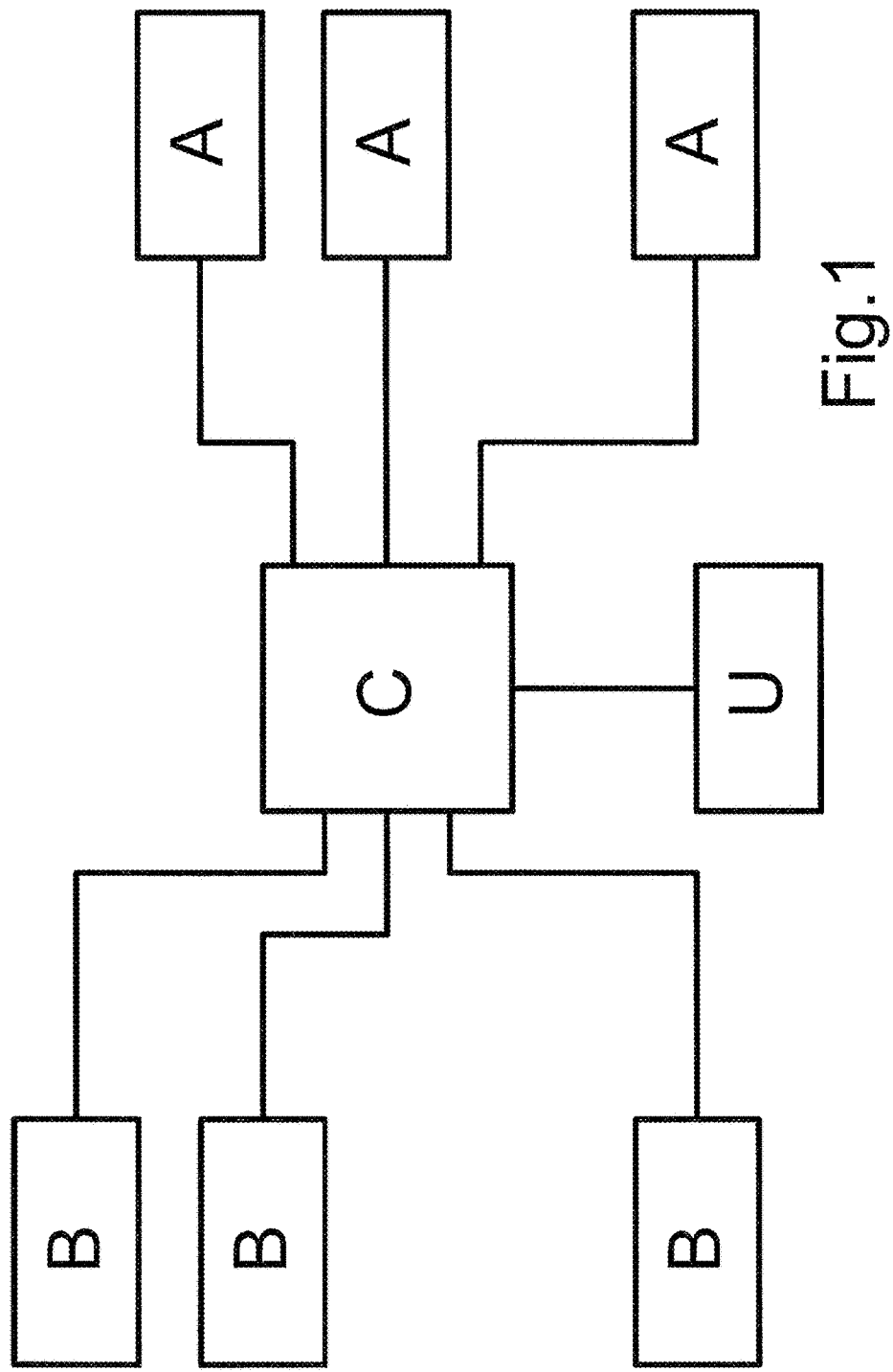
FIG. 1 shows a system for protected exchange of data

FIG. 1 shows a system for protected exchange of data, with multiple information provider devices A, multiple information receiver devices B, an intermediary service provider device C and a user device U. Intermediary service provider device C is linked to information provider devices A, information receiver devices B, and user device U.

Although symbolically direct connections are shown, the connections can also be established via one or more networks such as the Internet.

Each device can comprise a processor, a memory, and an input-output unit (not shown). The processor can be a general (micro) processor. In addition, a unit can comprise a special cryptographic processor. The memory may be configured for storing processor instructions for carrying out the steps of the method according to the invention. Further, the memory of a device may be configured for storing data and cryptographic keys, possibly a separate memory (protected or otherwise) is provided for that.

Each information provider device A may be provided with a database with data including data about the user. Each information provider device A may be provided with a storage apparatus for storage of its database, or have access to such database, for instance via a network. The processor of the information provider device A and/or the special cryptographic processor are configured so as, on the basis of a request, to read out information about the user from the database and to execute a secure comparison protocol in communication with intermediary service provider device C in which this information is used.

Each information receiver device B may be configured to perform a task on condition of receipt of a predetermined reply to a request for information about the user U from an information provider device A.

Intermediary service provider device C is configured to be able to execute the secure comparison protocol in communication with each of the information provider devices A.

In operation, the system is used for sending a message to device B with the reply to a request for information about U on the basis of information which is stored in a database of device A. Device B can send a message with the request, after which U and/or C preferably generate a further request based on the request from B, but made specific with a key for selection of information about U from the database of C. Devices A and C execute a secure comparison protocol to reply to the further request on the basis of information from the database of A, and using an encryption scheme of which C has the private decryption key. C decrypts the reply of the secure comparison protocol and sends it with help from U to B. U here generates information for blinding the reply. Device A performs the blinding before sending the reply of the secure comparison protocol to C, utilizing the homomorphic property of the encryption scheme of the secure comparison protocol, which makes it possible to compute the encryption of blinded information from the encryption of the information without decryption of the information.

Figure 2:
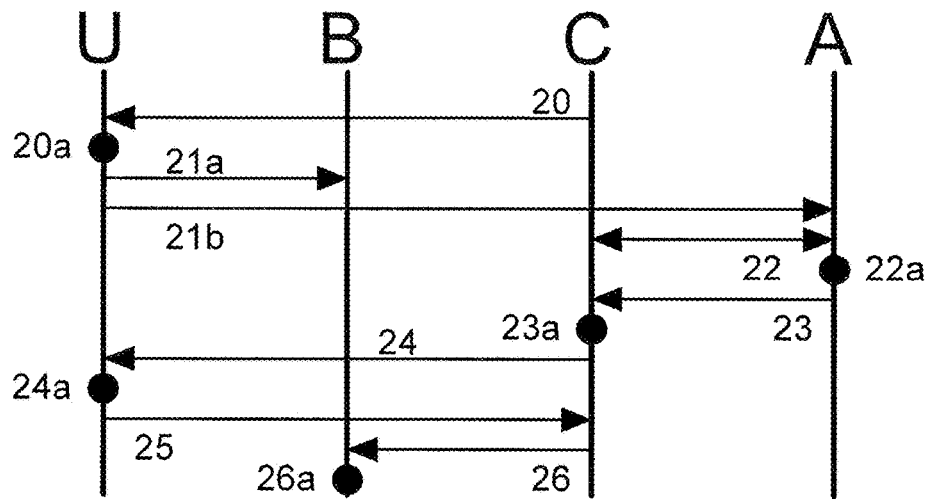
FIG. 2 shows a signal diagram for secure testing of information

FIG. 2 shows a signal diagram of an embodiment of secure testing of information.

1. C sends the certificates of A and B to the user U (message 20).
2. The user U takes out the public keys of A and B and checks them (action 20a) (this check is optional, C is already a trusted party).
3. User is forced to send a same random bit b_u to A and B without C learning the bit (messages 21a, b). An embodiment of this will be described with reference to FIG. 2a.
4. A and C execute the secure comparison protocol (exchange 22). At the end of that protocol A has the QR-enciphered outcome bit [t] (and C the decryption key).
5. A 'blinds' t with the random bit b_u (action 22a) and sends [t xor b_u] to C (message 23).
6. C deciphers the bit (t xor b_u) (action 23a) and sends it to the user U (message 24).
7. The user takes off his bit b_u and assesses whether or not he wishes to send the outcome t to B=RP (action 24a).
8. As soon as the user gives permission, C sends the bit (t xor b_u) to the B=RP (action 26 possibly together with a step of 3).
9. The B=RP knows b_u so can simply derive the outcome t (action 26a).

For step 4 use can be made of a secure comparison protocol known per se, as described, for instance, in the article "Comparing encrypted data" by T. Veugen. In such a secure comparison protocol, use is made of an encryption scheme with a public and private encryption key, the encryption scheme having a homomorphic property. That is, an algorithm exists which, from two encrypted numbers, computes directly, without decryption, an encrypted version of the sum (or a product) of the numbers, for example, by multiplication of the encrypted numbers. The Veugen article gives examples of this: Paillier, DGK (Damgård, Geisler, Krøigaard) and QR (Quadratic Residues), this last involving enciphering of bits with quadratic residues.

In the secure comparison, C has a reference number (e.g., limit for a date of birth) and the private key of the encryption scheme (and possibly also the public encryption key). A has the public encryption key of the encryption scheme, a random number and a confidential number (based on the database, e.g., date of birth) with which the reference number is to be compared. The random number is here known to A but not to C. Use is made here of the fact that A can provide information to C about the sum of the random number and the confidential number without revealing the confidential number to C.

C can carry out computations with this sum in the non-encrypted domain, encrypt a result of those computations with the public encryption key and send it to A. A can thereupon use the homomorphic property to compute without decryption an encryption of a sum or difference of this result and the random number or a number derived from the random number. A in turn can send this encryption of the sum/difference back to C again, to derive therefrom a partial result of the secure comparison by means of decryption with the private encryption key.

An important point is that the blinding of the above step 5 can be incorporated directly into such a protocol by placing at A's disposal the bit b_u of user U, or an encryption thereof with the public key of the secure comparison protocol. When A uses the homomorphic property to compute without decryption an encryption of the comparison result, A can further, without decryption, add an addition of the random bit b_u of user U to it. The result is that C, even after decryption with the private key of the secure comparison protocol, does not dispose of the result because C does not dispose of the random bit b_u. Although an example has been given of blinding of a 1-bit result with a bit b_u, it will be clear that blinding of multi-bit results with multi-bit data of U is possible.

Although the chosen embodiment of the secure comparison protocol is not relevant for this, by way of example two embodiments will be described.

The idea behind a first embodiment of the secure comparison protocol is that if the reference number and the confidential number are L bit numbers, the most significant bit of a sum of an offset and the difference between these numbers can be used to determine which number is greater. The offset is equal to the L-th power of 2, and is used to keep the sum positive. In the first embodiment A takes care that C disposes of the difference plus the random number plus the offset. A and C compute an encrypted remainder bit, which indicates whether upon division by the offset the remainder of the difference plus the random number is smaller than the remainder of the random number upon division by the offset. C computes from the difference plus the random number plus the offset the L+1st bit Z from the least significant bit, encrypts Z with the public key and sends the encrypted bit to A. A encrypts the L+1st bit R from the least significant bit in the random number and uses the homomorphic property to compute the encrypted sum of Z, R and the encrypted remainder bit. This sum contains an exclusive or bit of Z and R and a carry bit. A sends this encrypted sum to B which after decryption disposes of the exclusive or of Z and R and the remainder bit, which constitutes the result of the secure comparison protocol.

The idea behind a second embodiment is that the comparison between the reference number and the confidential number can be carried out by comparing first and second numbers with M bits from the least significant bit of the reference number and the confidential number, respectively, and repeating this recursively for first and second numbers with increasingly greater M. The first number with M bits is greater and smaller, respectively, than the second number with M bits, if the most significant bit of the first number is greater and smaller, respectively, than the most significant bit of the second number, or (given equality) when the first number with M−1 bits is greater and smaller, respectively, than the second number with M−1 bits. In the second embodiment A computes for successive values of M, utilizing the homomorphic property, an encrypted comparison result for M from an encrypted comparison result for M−1 and M-th bits of the numbers.

Figure 2A:
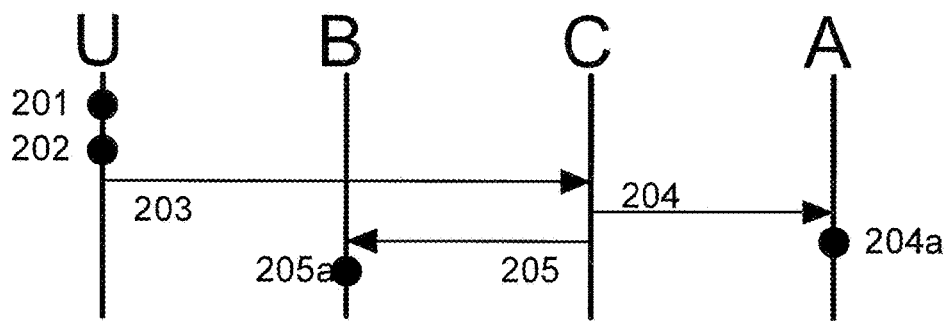
FIG. 2a shows a signal diagram for secret transmission of a bit

FIG. 2a shows a signal diagram of an embodiment of the sending of a bit to AP and RP without C learning the bit (step 3 hereinabove).

a. The user U generates a random bit b_u and a large enough random number r and computes the hash h_u=h(b_u|r) (action 201).

b. The user U enciphers the numbers (b_u, r) with the public keys of A=AP and B=RP (action 202).

c. The user U sends [b_u|r]_{A}, [b_u|r]_{B} and h_u to C (message 203).

d. C sends [b_u|r]_{A} and h_u to A (message 204) and A checks whether h_u is correct (action 204a).

e. C sends [b_u|r]_{B} and h_u to B (message 205) and B checks whether h_u is correct (action 205a) (this step can also be done later, as part of action 26 in step 8) when C sends the result to B).

With this, the following has been achieved:

A and B do not get to know each other's identity, but B has trust in the result because it comes from C.

The querying of A is preceded by a message from the user U, which renders it more difficult for C to ask arbitrary questions. In case of doubt, C may even be asked to submit [b_u|r]_{A}, [b_u|r]_{B} and h_u, after which A and B can confirm whether this information is right or not.

The user U does not need a certificate. What he does need to be capable of is: generating random numbers, computing hash functions, exclusive or execution of 2 bits, verifying signatures (only necessary for extra security) and enciphering messages.

In an embodiment, also a session token may be added. Possibly, (b_u, r, sessiontoken) instead of (b_u, r) could be used to ensure that the outcomes correspond to the right sessions.

The bit t that is to be communicated from A to user U is first conceptually inverted by having the user generate a bit b_u and sending that to A and then using the hash function to enforce that B receives the same bit. The use of hash functions is known per se, but applying a hash function to solve the above problem is not known.

The bit b_u in fact provides, in combination with the exor operation (exclusive or), for a simple form of encryption of the information (the bit t) that A releases.

An embodiment of the operation of the system will be described on the basis of Boolean verification, username/password (invariable attribute).

Figure 3:
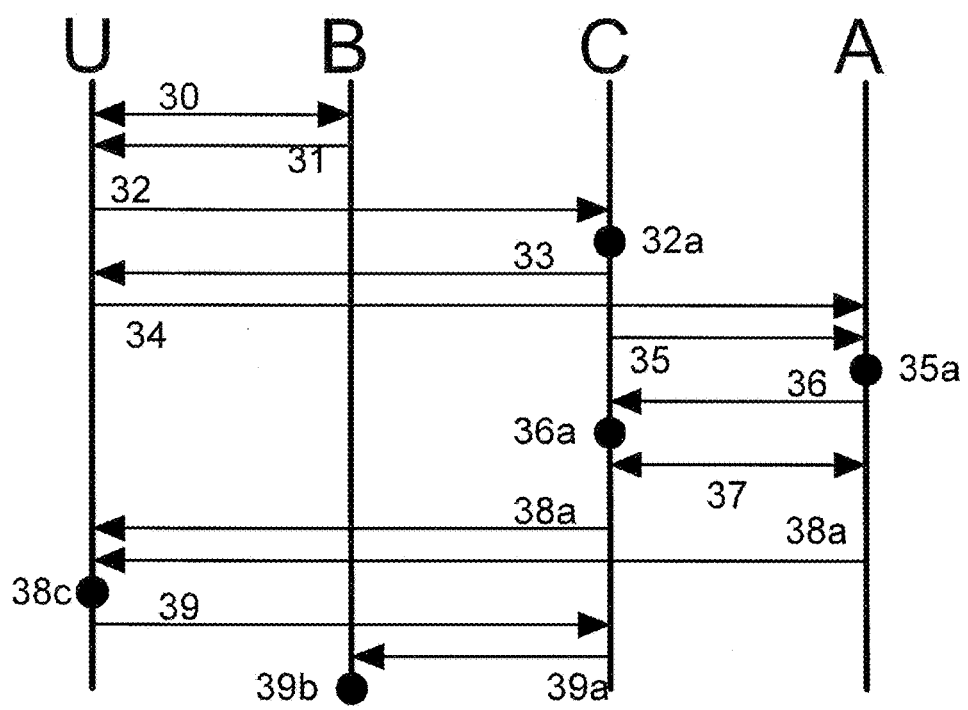
FIG. 3 shows a signal diagram for secure testing of information

FIG. 3 shows a signal diagram for secure testing of information for Boolean verification. An information provider device A will herein also be designated as Attribute Provider (AP), as an example an embodiment will be discussed in which the Attribute Provider (AP) disposes of the GBA (Gemeentelijke Basisadministratie: "Municipal Personal Records Database", a data collection of the authorities). An information receiver device B will also be designated as Relying Party (RP). The intermediary service provider device C will also be designated as Secure Identity Broker. User device U will also be designated as user, or Claimant. Further, the following abbreviations are used:

Public Key C=pub_tb
Private Key C=pri_tb (always remains in the hands of C)
Public Key AP=pub_ap
Private Key AP=pri_ap (always remains in the hands of the AP)
Public Key RP=pub_rp
Private Key RP=pri_rp (always remains in the hands of the RP)
eID Claimant Username=eid_usn
eID Claimant Password=eid_pwd
Source=collection of APs from which the RP accepts attributes
Existence=age of an attribute which the RP still accepts An example of a starting point of the example of FIG. 3 is that the Claimant with http visits a website of the RP (message exchange 30) and, for instance, wishes to buy an age-restricted article, wishes to use an age-restricted service or wishes to view age-restricted content. In this case: the claimant U is seeking access only to free content over age 16.

The RP (B) sends to the claimant a redirect (message 31) to a separate https screen, in which he is informed that an age check is required and login at C is to take place. A request to be replied to is sent along, which upon login is forwarded to C: signed and encrypted ((Request(Sessiontoken, 'Age', '≥', Norm Nx))pub_tb)pri_rp with Nx=16 years. Here, 'Age' is an element of the request that denotes the type of attribute the request is about, '≥' is an element of the request that denotes the kind of comparison, and Norm Nx (where Nx is, e.g., 16) is an element of the request that denotes a value with respect to which the comparison is to be made. "pub_C" and "pri_RP" denote that the request is encrypted with the public key of C and is signed with the private key of the RP. Thus, C can verify with pub_RP that the request does in fact originate from the RP and decrypt with the private key of C.

The claimant U logs in at C (message 32) with his username eid_usn and the password eid_pwd. Of each user, C has stored the username eid_usn and the hash of the password eid_pwd of each user. The password that the claimant has entered is hashed and compared with the stored hashed password. Further, of each user, C has multiple encrypted keys to APs with which the claimant has a relation. In the context of a database system a key is an information item that gives access to personal data. Examples:

The BSN (Burger service nummer: "Citizen's Service Number", a number that is associated with an individual person by government computers) is a key, for with the BSN the personal data of an individual can be queried in the GBA (Gemeentelijke Basisadministratie: "Municipal Personal Records Database", databases which are kept by municipalities);

Bank account numbers are keys, for with these account numbers personal data of an individual can be queried at the banks concerned;

The Driving license number is a key, for with this number personal data of an individual can be queried at the RDW (Rijksdienst voor het wegverkeer: "Government Road Transport Agency", a public body which keeps a database of vehicle data);

Student numbers are keys, for with this number personal data of an individual can be queried at educational institutes.

A key itself is also a personal datum, for it provides—with some effort—access to personal data of the individual to whom the key relates (WBP: Wet Bescherming Persoonsgegevens: "Personal Data Protection Act").

Of each user, C has multiple encrypted keys to APs with which the claimant has a relation.

encrypted (BSN)pub_ap1 for queries at GBA encrypted (Bank account number)pub_ap2 for queries at banks encrypted (Driving license number)pub_ap3 for queries at the RDW encrypted (Student number)pub_ap4 for queries at DUO (Dienst Uitvoering Onderwijs: "Education Implementation Agency")

encrypted (BSN)pub_ap5 for queries at BKR (Bureau Krediet-Registratie: "Central Credit Registration Bureau") etc.

The respective AP alone can decipher these encrypted keys.

After log-in of the claimant with eid_usn and eid_pwd, the claimant is known at C. C verifies that the signed request ((Request(Sessiontoken, 'Age', '≥', Norm Nx))pub_tb) pri_rp does in fact come from the RP with pub_rp. Thereupon C decrypts the remaining encrypted request (Request (Sessiontoken, 'Age', '≥', Norm Nx))pub_tb with pri_tb (action 32*a*).

C proceeds to show (message 33) to the Claimant the relations which:
1. are known at C (here: GBA, Bank, RDW, DUO and BKR)
2. could provide the requested attribute 'Age'
3. satisfy [Source]

The Claimant chooses the AP he wants, for example the GBA, and through this choice gives permission to query the 'Date of birth' to the chosen AP (message 34). C then sends the request signed and encrypted to the GBA (message 35): ((Request((BSN)pub_ap1, 'Date of birth'))pub_ap1)pri_tb.

In it, the element (BSN)pub_ap1 of the request is the key encrypted with the public key of the AP, the element ('Date of birth') of the request denotes the type of registered data that the request is about. "pub_ap1" and "pri_tb" indicate that the request is encrypted with the public key of the AP and signed with the private key of C, so that the AP can verify with pub_tb that the request comes from C and can decipher the request with the pri_ap1.

So, upon instruction of the claimant, C is here querying the GBA, without knowing or receiving personal data. In this case, [Existent] is not relevant, because the date of birth is queried real-time, and cannot age. The GBA receives the ((Request((BSN)pub_ap1, 'Date of birth'))pub_ap1)pri_tb. The GBA processes this request in action 35*a*. With pub_tb the GBA verifies that the request comes from C. By thereupon first deciphering the request with the pri_ap1 and then deciphering the BSN with pri_ap1, the GBA now knows of which registree data are to be retrieved. In an embodiment the computer (A) of the GBA is configured to check whether the request is a permitted request, and to carry out the next steps only if this is so.

With the aid of this BSN the record of the registree is retrieved (this is still in action 35*a*). Based on the request from C, the date of birth is filtered from this record, for instance in the string form '01-04-1995'. This date is a personal datum and is not provided to third parties in this form. The GBA date is transformed into a difference, by subtracting the GBA date from the current date. This transformation reduces the number to be compared, which saves computing time. Naive algorithm in this case: 20121009−19950401=170,608. The minimum number is 0 and the maximum number is 21001231−19000101=2,001,130. This number can be represented with 21 bits and is encrypted in conformity with the principle of 'Comparing Encrypted Data' [Thijs Veugen] and leads to 21 numbers of 1024 bits. From this, the real date of birth cannot be reconstructed anymore. This number X is sent, signed, to C: (X)pri_ap1 (message 36). It is not a personal datum and may be provided to C by the GBA. With logic operations, the AP also derives a bit P from the number X.

C receives from the GBA the signed number (X)pri_ap1 and verifies that this number originates from the GBA with pub_ap1 (action 36*a*). To compare the number X (which represents the simplified date of birth of the claimant) with the norm Nx, C converts the norm Nx (in this case 16) to the date preceding today's date by 16 years, for instance '01-10-1996', and simplifies this number in the same manner as the GBA did: 20121009−19961001=160,008. This number Y is also encrypted into 12 numbers of 1024 bits. On the basis of the Quadratic Residues principle the numbers X and Y are compared, whereby numbers are regularly sent back and forth between the AP and C (message exchange 37). On each of these, logic operations are performed by GBA and C. This eventually yields to C 1 bit Q.

Through the logic operation P XOR Q it can be determined whether the Claimant satisfies the norm Nx. C has bit Q and the AP has bit P. The logic operation has to be performed by the Claimant, for C does not want to know the outcome of the comparison, since the outcome is a personal datum.

The Claimant receives from C bit Q, signed with pri_tb (message 38*a*): (Q)pri_tb.

The Claimant receives from the AP bit P, signed with pri_ap1 (message 38*b*): (P)pri_ap1. In the browser of the Claimant JavaScript code is executed which executes P XOR Q (action 38*c*).

Result=0: Claimant satisfies Norm Nx (claimant is age 17: 01-04-1995 and 01-10-1996)

Result=1: the claimant does not satisfy Norm Nx

The JavaScript code gives the reply 'You satisfy the norm of age 16 or older.' "Do you want to forward this result to RP?" The Claimant then gives permission to supply the bits P and Q (message 39).

Java/JavaScript is an example of executable code which is executed in the browser of the Claimant. The results are not visible to others.

The RP has two bits coming in:

bit P: preferably supplied by C (message 39*a*), but originally determined by the AP.

bit Q: computed by C.

The https session is ended.

After a logic operation P XOR Q it appears (action 39b) that:
Bit=0: the (anonymous) claimant is ≥Norm Nx
Bit=1: the (anonymous) claimant is <Norm Nx
The RP now knows whether the claimant is older than the Norm Nx or not. In this case: The claimant gets access via the http session to the requested content without revealing his identity or his exact date of birth.

General Principle

APs
  verify that the signed request can originate only from intermediary service provider device C (with pub_tb)
  cannot find out what the provided numbers are used for
  know for certain that the provided numbers are not traceable to any individual
  trust that intermediary service provider device C submits queries only after permission of a claimant. They can not check this directly, but can afterwards.

Intermediary Service Provider Device C
  verifies that the signed Request originates from the RP (with pub_rpx)
  verifies that the signed number X originates from the AP (with pub_apx)
  verifies that the signed bit Q originates from the AP (with pub_apx)
  has stored only hashes of passwords of claimants. In case of intrusion, these are worthless.
  trusts the APs. These are parties having a reliable (basic) record registration
  trusts the RPs. They have a contract.
  trusts the claimants. They can only log in with a reliable eID RPs
  know for certain that C alone can open the encrypted Request (with pri_tb)
  trust that C gives a reply that is based on information from reliable APs satisfying [Source] and [Existence]
  cannot find out which AP has provided the requested attribute (with APs>1)
  trust that C only replies substantively after permission of the claimant.

Claimants
  trust that C submits queries exclusively after permission of the claimant.

The system can be applied to a number of uses (cases):
Case 1 (already described). Boolean verification, username/password (invariable attribute)
Case 2. Boolean verification, [IRMA]smartcard (invariable attribute)
Case 3. Boolean verification, username/password (variable attribute)
Case 4. Boolean verification, [IRMA]smartcard (variable attribute)
Case 5. Text verification, username/password
Case 6. Text verification, [IRMA]smartcard Assumption
  In the central cases 1, 3 and 5 the assumption is that the claimant disposes of an eID (username/password) and that the relations that the claimant has with the APs are known at C. These relations can be established by laying down with each eID a set of encrypted keys. If with each eID the intermediary service provider device C lays down keys (BSN, Bank account numbers, Driving license numbers, Student numbers, etc.) which are encrypted with the public keys of the APs that utilize these keys, then these encrypted keys cannot be reduced to the 'real' key by intermediary service provider device C anymore. The APs alone can do that, by means of their private keys. C hence cannot reduce the encrypted keys to any individual either. Consequently, the encrypted keys cannot be regarded anymore as personal data (WBP). The set of encrypted keys does indicate that the individual is (probably) known at the AP whose encrypted key has been laid down, but this is not to be regarded as a personal datum either (WBP).

The data that the several APs could provide are publicly known (example: in the GBA the date of birth is laid down) and are never within the scope of the WBP.

Starting Points of the Service
  Listed below are the provisional starting points of the interested parties, with the interests [Privacy], [Business enablement], [Business case], [Earning model], [Competition] and [Trust].

Starting Points for C:
  Is broker of information which originates from third parties and is provided to third parties [Business Enablement]
  Does not store data [Privacy] and [Trust]
  Can automatically effect the translation between supplied attribute and attribute to be delivered (for example, 29-08-1968 is translated into 'older than age 18') [Privacy]
  May possibly act as information provider itself as well [Competition]
  Invests in connecting up providers and buyers of information and maintains this infrastructure [Business Enablement]
  Does not make a distinction among information providers or information buyers; accepts them and uses the same rates [Competition]
  Receives for each query a (small) amount for the use of the broker function [Earning model], comparable to payments by switch card (PIN payments)
  Pays for each query the amount that the information provider asks for his information supply [Business case]

Starting Points for the Information Providers:
  Supply attributes or identities verified by them to third parties for verification purposes [Business Enablement and Trust]
  Supply exclusively this information and also do so exclusively upon request of the user [Privacy]
  Never learn for what purpose this information is being supplied [Privacy]
  Receive for each query a (small) amount from C, for providing the information [Earning model], and themselves determine the amount in exchange for which they are prepared to provide the information [Competition]

Starting Points for the Information Buyers:
  Verified information comes from (government) parties which themselves have supplied this information (passport, driving license, GBA), or from (market) parties which themselves have verified this information (banks, telcos, DUO, SVB [Sociale Verzekeringsbank: Dutch organization that implements national insurance schemes], pension funds) with the aid of the first-mentioned means [Trust].
  The verified information concerns only the minimal information that is necessary for the performance of a legal task (for example, 'older than 18' for purchase of age-restricted articles, so not the date of birth) or that is necessary for business operation (for example, name/address/city ("NAW") for a delivery service) [Privacy].
  (Possibly) determines himself which information providers are accepted for his purpose [Trust]
  Can use the provided information to demonstrate legal compliance to supervisors (for example, a delivery, accompanied by an attribute) [Trust]

Pays a (small) amount for each query [Business case] to C, by analogy with switch card (PIN) payments via Currence.

Starting Points for the User:

The threshold for the user to employ the verification facility should be as low as possible [Business Enablement]. If possible:

Reuse (usable side by side) of existing log-in mechanisms

As few log-in events, PIN codes, tokens, smart cards, extra clicks, etc., as possible No extra issuing body for smart cards, codes, etc.

No client software

Chooses himself which information provider can provide the requested information (banks, authorities, telcos, etc.) [Privacy and Competition]

Does not pay, or does not pay directly, for the supply of the information [Business Enablement]

Design Starting Points Per Interface

The principle is based on the Extended Backbone Model (TILT study). Four roles are distinguished:
1. C, the spider in the web
2. Information providers
3. Information buyers
4. Users In the model the principles of a decentralized model (IRMA) are combined with a central model. The user can choose between:

an eID in the form of a smartcard/card reader protected with a PIN code or, for example, a biometric authentication (fingerprint)

an eID in a form without hardware, such as a username/password, possibly combined with a second channel (such as SMS)

Decentralized Model:

The attributes of the user are stored on a smartcard. C serves solely as an intermediary of encrypted data between the information providers and the user and between the user and the information buyers. The encryption of data is done with a public key. The private key is on the smartcard of the user. C is the deal maker and provides the interfaces with the other three roles. The emphasis is on protection of privacy.

Central Model:

The attributes of the user remain stored at the information providers. Users can log in at C. On behalf of the user, C queries attributes at the information providers. After permission of the user, C supplies the attributes to the information buyers. The encryption of data is done with a public key. The information buyer can unlock the encrypted data with a key which is, for instance, derived from a PIN code which the user provides when he agrees to the information provider. In addition to being a deal maker, C is also an active party. The emphasis is on user convenience.

For the information buyers it makes no difference whether a user prefers or uses the decentralized model or the central model. They have only one standard interface with C.

For the information providers it makes no difference either whether the attributes are provided encrypted to C or encrypted to the user. They, too, have only one standard interface with C.

For C it does make a difference which principle the user wishes to apply; handling differs. On the other hand, the invoicing to the information buyers (transaction) and the compensation to the information providers (transaction) remain the same.

Design Principles for C:

C is both Certificate/Credentials Service Provider (CSP) (towards all three other roles) and the Authentication Service Provider (ASP) (towards the users)

C functions as a Federated Identity Provider for the benefit of many possible Relying Parties C issues eIDs to users who want an account. An account is always issued on the basis of a verified source. Possibilities:

Sending eID to a GBA address (own issue accounts)

Collecting eID with a paper ID (passport, ID card or driving license)

Reuse of existing eID (Internet banking, MyXXX telco accounts) In this case, also other parties are ASPs that are trusted for C The form of the eID is not fixed yet C is not aware of what information is exchanged (computing on encrypted data)

C guarantees to the information buyers that the attributes:

come from the APs which the information buyer accepts (S)

are sufficiently current for the AP (A)

Both parameters are contractually laid down between RPs en C

To be solved or to be accepted:

Security by centralized account storage and SPOF

Linkability by C through finding out the user after authenticating

C knows who has interacted with whom (pp. 31-32).

Design Principles for the Information Providers:

Information providers are Attribute Providers (APs)

The APs receive from C a request to provide a specified attribute of a registree. This concerns a 'bare' attribute, from which it cannot be derived for what purpose the query is made.

Example: the date of birth.

Question: Request(Identifier, Attribute)

Answer: Response (Identifier, Attribute, [S], [A])

The manner in which the AP knows for what registree an attribute is to be provided (Identifier) is yet to be established.

Upon request, the AP additionally provides information [Source] as to who the provider is (for example 'GBA') and what the currency of the attribute is [Existent] in the form of a date/time stamp.

Design Principles for the Information Buyers:

Information buyers are the Relying Parties (RPs)

The RP has to know for sure that the reply to a request comes from an AP that he trusts [Source] and is sufficiently current [Existent]. The RP specifies this contractually with C.

The RP has to know for sure that the reply to a request relates to the Claimant with whom he wants to carry out a 'transaction'

The RPs can send C different types of requests:

Boolean Attribute Verification Against a Norm Nx:

Question: Request(Identifier, Type, Operator, Norm Nx)

Answer: Response (Identifier, yes/no)

Thus, an RP can ask questions of age: $\geq Na$, $\geq Nb$, $<Nc$, with a=16, b=18 and c=65 or, for example, a creditworthiness question $\geq Nd$ with d= € 4,000.

Text Attribute Verification

Question: Request(Identifier, attribute, Mx)

Answer: Response(Identifier, attribute)

Thus an RP can query attributes that are sufficient for his business operation, such as 'Name' (identity) Ma, 'Date of Birth' (identity) Mb, Address (identity) Mc, etc.

The manner in which the RP knows for what registree an attribute is to be retrieved (Identifier) is yet to be determined.

Between the RPs and C it is contractually laid down beforehand that:

Responses have been checked against the fixed norm Mx or Nx.

What is thus prevented is that the RP, by repeated querying of Boolean attributes, can find out the precise value of the attribute (e.g., age or creditworthiness).

Responses relate only to attributes that the RP is allowed to query. Never is anything more supplied to the RP than is minimally needed.

Responses come from an AP that is acceptable to the RP [Source]. (For instance, the GBA and banks, but not telcos and Facebook)

Responses have the acceptable currency per attribute [Existent]

C guarantees the RP that the above four conditions have been met, without revealing the actual sources or date/time stamps.

The Type (what attributes can be queried) is yet to be determined.

The RP gets a response that has been encrypted by the AP with a public key.

The response can be unlocked with the private key of the user. The private key can be provided:

by C after permission of the user ('central variant') as with PIN by the user himself ('decentralized variant').

Starting Points for the User:

The user is the Claimant.

The user disposes of an eID that has been issued by C

In both the decentralized and the central model logging in at C is necessary, to enable the dealmaking between the parties.

Case: Course of a Transaction Involving an Online Purchase Purchase Process Up Until the Age Check The user goes to www.gall.nl The user puts a bottle of whisky in his basket The user wants to pay (step 1)

The Age Check

Gall gives a pop-up for age check and asks the user to log in at C.

The user logs in at C with his eID

The user-C session has to be related to the user-Gall session

Decentralized Model:

The user provides the requested attribute of his smartcard via C to the RP. C checks whether the (encrypted) attribute satisfies the four conditions contractually agreed upon with the RP.

Central Model:

From C, the user gets to see the parties that are acceptable to the RP, and where the user is registered (cf. IDeal).

The user gives once-only permission to C to query the attribute at AP on his behalf. C queries the attribute at the AP and checks whether the four conditions are satisfied.

C asks the user for permission to provide the attribute to the RP.

C provides the attribute, encrypted, to the RP

Decentralized model:

The user takes his private key from the smartcard and provides it via C to the RP, so that the record can be unlocked by the RP.

Central Model:

The user provides his private key in the form of a PIN code or, for instance, an SMS code to be keyed in, via C to the RP.

The invention claimed is:

1. A method for secure transmission of information between a source of information (A) and a destination of information device (B), the method comprising:
an intermediary device (C) that interfaces between the source of information (A) and the destination of information device (B), wherein the intermediary device (C):
executes a secure comparison protocol based on whether a first value is above a threshold value, the intermediary device (C) executing the secure comparison protocol with the source of information (A) associated with a user device (U), in order to provide an encrypted comparison result, the encrypted comparison result being blinded by the source of information (A), and based on blinding information associated with the user device (U);
decrypts the blinded, encrypted comparison result to provide the blinded comparison result;
receives from the user device (U) a hash of a bit value and a first and second encrypted version of the bit value and a random number, which are encrypted with public encryption keys of the source of information (A) and the destination of information device (B), respectively;
sends the hash of the bit value and the first encrypted version of the bit value and the random number to the source of information (A), for blinding the comparison result with the bit value;
sends the hash of the bit value and the second encrypted version of the bit value and the random number to the destination of information device (B).

2. A method according to claim 1, wherein the intermediary device (C) sends the blinded comparison result to the user (U).

3. A method according to claim 1, wherein the intermediary device (C):
receives a signed request from the user (U);
verifies whether the signed request received from the user (U) originates from the destination of information device (B);
sends a further request based on the request that is signed and encrypted, to the source of information (A); and
executes the secure comparison protocol with information, on the basis of the further request with the source of information (A).

4. A method according to claim 3, wherein the intermediary device (C) disposes of an encrypted key for selection of information about the user device (U) from the source of information (A), wherein:
the intermediary device (C) includes the encrypted key in the further request;
the intermediary device (C) encrypts the further request with a public encryption key of the source of information (A), and sends the further request signed with a private encryption key of the intermediary device (C).

5. A method according to claim 4, wherein the intermediary device (C) disposes of a set of encrypted keys for selection of information about the user (U) from a set of multiple sources of information (A), and in which method the intermediary device (C) chooses the source of information (A) from the set.

6. A method according to claim 3, wherein the intermediary device (C) disposes of a username and a hash of a password of the user, and the intermediary device (C) logs in the user, wherein the intermediary device (C) receives a password from the user, hashes the received password and compares it with a stored hashed password prior to sending the further request to the source of information (A).

7. A method according to claim 3, wherein the intermediary device (C) disposes of a set of combinations of usernames and hashed passwords, and a set of encrypted keys for selection of information about different users (U) of the intermediary device (C) and on the basis of login data, selects which user the encrypted key is included in the further request.

8. A method according to claim 1, wherein the intermediary device (C) after receipt of permission of the user forwards the blinded comparison result to the destination of information device (B).

9. A method according to claim 1, wherein the intermediary device (C) sends certificates of the source of information (A) and the destination of information device (B), to the user device (U), prior to executing the secure comparison protocol.

10. A method according to claim 1, wherein the comparison result is a bit and the blinding information contains a bit with which the bit of the comparison result is blinded.

11. A method for controlling secure transmission of information according to claim 1, the method further comprising the user device (U) controlling the secure transmission of the information by the following operations:
  generating blinding information;
  encrypting the blinding information with a public key of the source of information (A);
  encrypting of the blinding information with a public key of the destination of information device (B);
  sending the encrypted blinding information to the source of information (A) and the destination of information device (B) using an intermediary device (C); and
  sending an instruction to the intermediary device (C) to send the blinded comparison result to the destination of information device (B).

12. A method according to claim 11, wherein the user receives a request for information from the destination of information (B) that designates information in the source of information (A) for forming the comparison result, and the user forwards the request to the intermediary device (C).

13. A method according to claim 12, wherein the user device sends an instruction to the source of information (A) for executing a secure comparison protocol with the intermediary device (C).

14. A computer readable medium storing instructions that when executed by a processing device, cause the processing device to perform the operations of claim 11.

15. An intermediary device (C) for secure transmission of information between a source of information (A) and a destination of information device (B), wherein the intermediary device (C) includes one or more processors programmed to:
  execute a secure comparison protocol based on whether a first value is above a threshold value, the secure comparison protocol being executed with the source of information (A) associated with a user device (U);
  determine an encrypted comparison result about the user device (U), the result being blinded as associated with the source of information (A);
  decrypt the blinded encrypted comparison result to obtain a blinded comparison result;
  send the blinded comparison result to the user device (U);
  receive from the user device (U) a hash of a bit value and a first and second encrypted version of the bit value and a random number, which are encrypted with public encryption keys of the source of information (A) and the destination of information device (B), respectively;
  send the hash of the bit value and the first encrypted version of the bit value and the random number to the source of information (A), for blinding the comparison result with the bit value; and
  send the hash of the bit value and the second encrypted version of the bit value and the random number to the destination of information device (B).

16. A user device that controls secure transmission of information between a source of information (A) and a destination of information (B), said user device including one or more processors programmed to:
  generate blinding information;
  encrypt the blinding information with a public key of the source of information (A);
  encrypt the blinding information with a public key of the destination of information device (B);
  send the encrypted blinding information to the source of information (A) and the destination of information device (B), respectively-using an intermediary device (C);
  receive a blinded comparison result from the intermediary device (C), the blinded comparison result being based at least on a secure comparison protocol based on whether a first value is above a threshold value;
  send an instruction to the intermediary device (C) for transmission of the blinded comparison result to the destination of information device (B);
  receive from the user device (U) a hash of a bit value and a first and second encrypted version of the bit value and a random number, which are encrypted with public encryption keys of the source of information (A) and the destination of information device (B), respectively;
  send the hash of the bit value and the first encrypted version of the bit value and the random number to the source of information (A), for blinding the comparison result with the bit value; and
  send the hash of the bit value and the second encrypted version of the bit value and the random number to the destination of information device (B).

* * * * *